Sept. 15, 1970   R. A. JOHNSON ET AL   3,529,272

TEMPERATURE SWITCH

Filed May 21, 1968

INVENTORS
ROBERT A. JOHNSON
PETER M. BYAM

BY
ATTORNEY

United States Patent Office 3,529,272
Patented Sept. 15, 1970

3,529,272
TEMPERATURE SWITCH
Robert A. Johnson and Peter M. Byam, Greece, N.Y., assignors to Fasco Industries, Inc., Rochester, N.Y., a corporation of New York
Filed May 21, 1968, Ser. No. 730,706
Int. Cl. H01h 37/04, 37/52
U.S. Cl. 337—380        4 Claims

ABSTRACT OF THE DISCLOSURE

A hermetically sealed, metal housing contains an insulator plug, which is seated resiliently against an internal shoulder in the housing by a metal spring. A metal rivet is secured in the plug for engagement by a bimetallic, temperature-responsive disc, which is mounted between the shoulder and plug to flex axially in opposite directions with predetermined changes in ambient temperature. The housing is externally threaded for mounting in a grounded hole: and the cap has a contact for connecting the switch through a safety device to a power supply, so that the device will be energized whenever the disc flexes into contact with the rivet.

---

Figure 1:
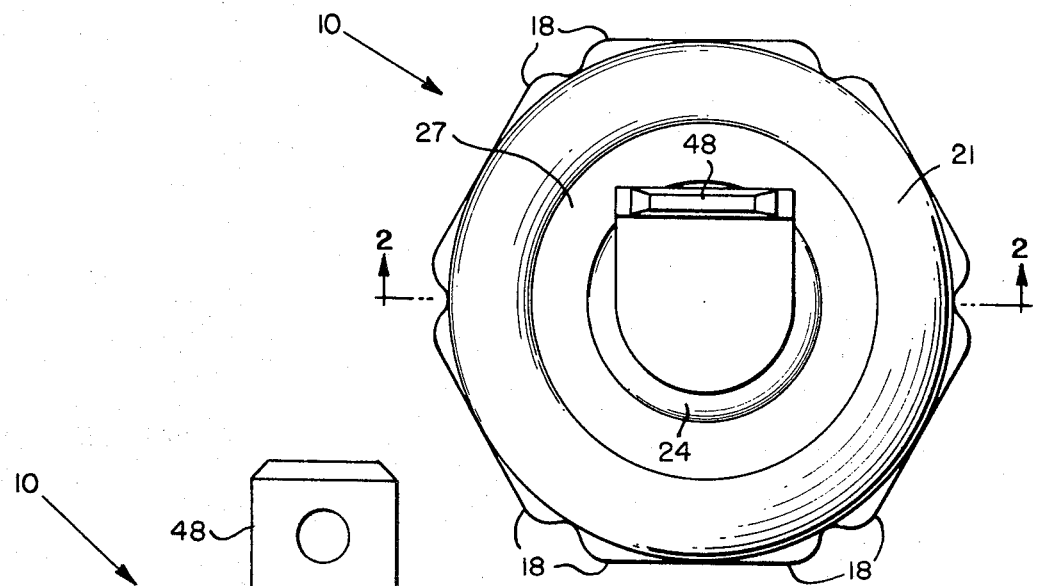

This invention relates to electrical switches, and more particularly to a temperature-responsive switch for operating a warning system as, for example, one associated with an automobile engine.

For systems which may be subject to undesirable overheating, it is customary to provide a safety device to warn of an overheated condition. Automobiles, for example, are provided with devices which warn the driver of any dangerous overheating condition in the automobile engine, and more particularly, of the liquid coolant in the automobile radiator. A warning device of the type described usually incorporates a temperature-responsive switch, and a signal that is operated thereby, as, for instance, a warning light mounted on the dashboard of an automobile.

To provide reliable warning, it is essential that the temperature-responsive switch be sturdy, and consistently responsive to the temperature gradient for which it is calibrated. Moreover, particularly in the case of automotive warning devices, it is essential that the switch be relatively compact and inexpensive to manufacture.

It is an object of this invention to provide an improved temperature-responsive switch, which is extremely sturdy, and very reliable over extended periods of use, as compared to prior such switches.

Another object of this invention is to provide an improved temperature-responsive switch, which is particularly suited for the dual purpose of detecting the overheating of both the engine block of an automobile, and of the liquid coolant contained in the block.

A more specific object of this invention is to provide an improved, snap-action, temperature-responsive switch of the type that utilizes a bimetallic disc for opening and closing the switch.

Another object of the invention is to provide an improved, snap-type action switch of the type described, which will automatically reset within an extremely short time after the overheated condition of a system has been corrected.

Other objects of the invention will be apparent hereinafter from the specification and from the recital of the appended claims, particularly when read in conjunction with the accompanying drawing.

Figure 2:
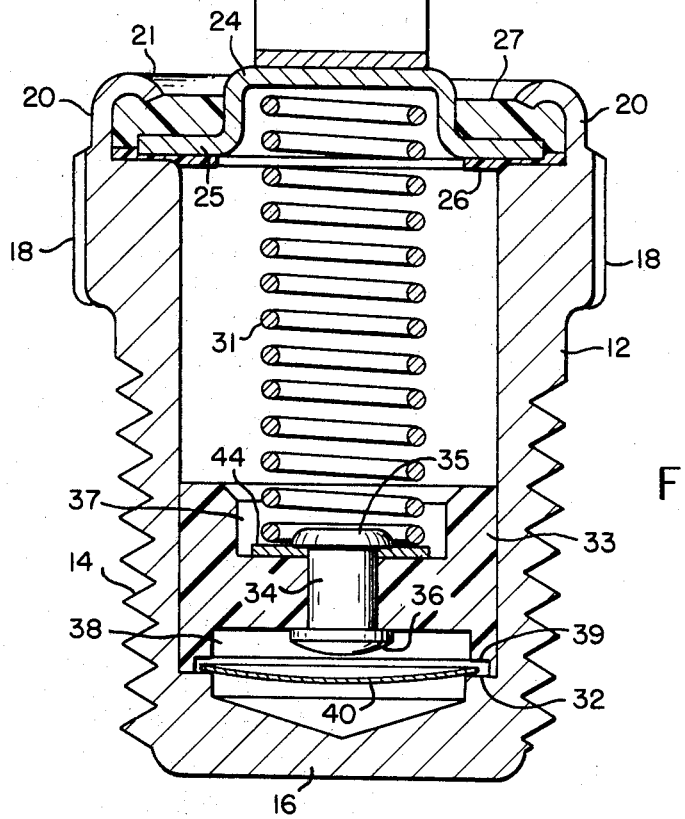

In the drawing:

FIG. 1 is a plan view of a switch made in accordance with one embodiment of this invention; and FIG. 2 is a sectional view of the switch taken along the line 2—2 in FIG. 1 looking in the direction of the arrows.

Referring now to the drawing by numerals of reference, 10 denotes the switch generally. It has a hollow, generally cylindrical metal housing 12 which is externally threaded, as denoted at 14, to thread into an automotive engine block. The housing is closed at one end by an integral, transverse end wall 16. The opposite end of the housing 12 is of slightly enlarged area and has a hexagonal perimeter with six flats 18 for accommodating a wrench. Beyond its hexagonal portion, the thickness of the wall of the housing is materially reduced; and this thin-walled portion 20 of the housing is crimped or peened over, as at 21 to secure an inverted, generally cup-shaped metal cover 24 on the housing to close said opposite end of the housing. This cover has a lateral flange 25, which overlies a shoulder 22 on the housing 12, and seats upon a resilient insulator ring 26. Another resilient insulator ring 27, which is substantially thicker than insulator 26, seats on flange 25 and cover 24. It is engaged by the crimped portion 21 of the wall portion 20 of housing 12.

Mounted in housing 12, and held by a coil spring 31 resiliently against an internal, circumferential shoulder 32 formed in the housing adjacent end wall 16, is a molded insulator plug 33. Secured in plug 33 is an electrically conductive contact or rivet 34. At its opposite ends rivet 34 has heads 35 and 36, which project into recesses 37 and 38 formed in opposite ends respectively, of the plug 33.

Mounted between plug 33 and the closed end 16 of housing 12, and with its marginal edge extending between should 32 and an internal shoulder 39 formed in the adjacent end of plug 33, is a bimetallic disc 40. The shoulders 32 and 39 limit the axial movement of disc 40 in the housing, but at the same time permit the center of the disc to flex into and out of engagement with the rivet head 36.

Spring 31 is mounted in housing 12 between the cover 24 and a metal washer 44, which is secured beneath rivet head 35 in the bottom of recess 37 in plug 33.

Welded to the exterior of cover 24 is a conventional, right angular male terminal 48.

In use, the housing 12 is threaded into a heat sink, or hole, in the part whose temperature is to be sensed. For example, for automotive use, the housing 12 may be threaded into an engine block to be responsive both to the temperature of the engine block, and to the temperature of the coolant in the radiator. In such instance the end of the switch, which contains the bimetallic disc 40, is exposed to the radiator liquid to sense its temperature, while the threaded section 14 of the housing would be in intimate, threaded contact with the engine block proper, to sense the temperature of the engine block itself, even if the radiator liquid has not reached a temperature to operate the switch.

Basically the switch is a grounding type switch, in other words, completing an electrical circuit to ground when the switch is actuated. The switch may be built either as a normally open, or as a normally closed switch.

Internally in the embodiment illustrated disc 40 is positioned so that it is not in electrical contact with the rivet until the switch is heated to a predetermined temperature, at which point the disc will reverse its shape and flex suddenly and wedge itself between the metal housing and the rivet. This completes the circuit from terminal 48 through cover 24, the spring 31, washer 44, rivet 34 bimetallic disc 40 and housing 12 to ground. After the ambient temperature of the disc 32 has dropped below a predetermined value, the disc will flex suddenly back to its original position, to open the circuit.

The operation just described applies when the switch functions as a normally-open switch. For normally-closed operation, the disc 40 is inverted, so that it would be in contact with the rivet 34 at room temperature, and at a predetermined temperature will reverse its shape and break electrical contact with the rivet.

From the foregoing it will be apparent that the switch disclosed herein provides a relatively simple and extremely compact and sturdy device for monitoring the temperature of systems which may overheat. By constructing the switch so that it may sense both the engine block temperature and temperature of the liquid in the cooling system, protection is afforded against the situation in which the level of the liquid in the radiator has fallen to the point where the liquid no longer is in contact with the switch housing 12. In such instance the overheating of the engine would still be sensed as the result of the detection by the switch 10 of the excessive heat in the block itself. As an alternative, of course, the housing 12 can be threaded into a blind hole, without being in contact with any radiator fluid, in which case it would be responsive only to the temperature of the block itself.

Since the housing 12 is made of a single piece of metal, it practically eliminates the opportunity for any radiator fluid, or other foreign matter, to leak into the housing interior. Moreover, because of the crimped-gasketed closure, the switch is hermetically sealed against moisture and dirt that would disrupt operation of the switch if the internal parts were left exposed.

An additional major advantage of this switch is that the spring 31 operates to take up any undesirable slack or tolerances, which might otherwise develop in the switch due to slight variations in the dimensions of the several parts employed therein. For example, to avoid unnecessary delay after an associated system has cooled down from a dangerous temperature that has led to the actuation of the switch 10, it is desirable that the switch reset or return as soon as possible to its normal position (for example to the open position in the embodiment illustrated). To effect this quick return or reset, it is desirable that the distance normally separating the disc 40 and head 36 be minimized, so that after the disc is flexed in response to excessive temperatures, it will take but a slight lowering of the system temperature, below the critical temperature, to effect the return of the disc to its open position. The greater the distance normally separating the disc 40 and the rivet 36, the longer will be this reset time. If, for example, the rivet 34 were to be attached rigidly to the cover 24, rather than being connected thereto resiliently by the spring 31, normal production dimensional variations in the depth of the bore of the housing, cover thickness, housing length, the crimping dimensions of flange 20, etc., would all collectively establish the ultimate spacing between the rivet and the disc 40. With so many dimensional variations involved, it would be extremely difficult to manufacture each switch 10 with a predetermined, desirable reset time. On the other hand, by using the spring 31 in the manner shown, most of the above-denoted dimensional variations are eliminated or absorbed by the spring. The only dimension variations influencing the distance which normally separates head 36 and the disc 40, and hence the reset time, are the thickness of the head 36, and two mold dimensions of the plug 33, for example, the depths of the recesses 37 and 38. The spring 31, of course, holds the plug 33 against the shoulder 32 of the housing 12, with substantially greater force than the force exerted upwardly against the rivet head 36 by the disc 40, when the latter flexes upwardly.

The terminal 48 is, of course, connected electrically with the device which is to signal the alarm, as for instance, a light on the dashboard of the automotive vehicle.

The length of the housing, including the threaded portion 14, may be varied to suit the use to which the switch is to be put. Customer preference may require an extended length for deeper insertion into a liquid. However, the internal construction of this switch is such that merely by varying the length of spring 31 it is possible to accommodate the switch to a multitude of applications.

While the invention has been described in connection with a specific embodiment thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. A temperature-responsive switch, comprising
   a hollow, electrically conductive housing having an internal circumferential shoulder formed thereon intermediate its ends,
   a bimetallic, temperature-responsive, electrically conductive disc seated around its margial edge on said shoulder in said housing to flex in opposite directions in response to predetermined changes in the ambient temperature,
   a dielectric plug mounted in said housing at one side of said disc,
   an electrically conductive contact secured in said plug and having one end thereof confronting said one side of said disc,
   an electrically conductive spring in said housing urging said plug toward said disc, thereby resiliently to hold said one end of said contact in position to be engaged by said disc, when said disc flexes in one direction, and
   means for electrically connecting opposite ends of said spring in circuit with the other end of said contact and a power source.

2. A temperature-responsive switch as defined in claim 1, wherein
   said housing has an internal shoulder formed thereon intermediate its ends, and
   said plug has thereon a lateral surface overlying the marginal edge of said disc and said shoulder, and cooperating with the latter to limit the axial movement of said disc in said housing.

3. A temperature-responsive switch as defined in claim 1, wherein said connecting means comprises
   an electrically conductive cover secured over an opening in one end of said housing and electrically insulated therefrom,
   a terminal fastened to said cover for conductively connecting said cover to said power source, and
   an electrically-conductive washer mounted on said plug adjacent the end thereof remote from said disc, and engaged with said contact,
   opposite ends of said spring being engaged with said cover and said washer, respectively, whereby said terminal is electrically connected through said spring to said contact.

4. A temperature-responsive switch as defined in claim 3, wherein said contact comprises a rivet secured in said plug centrally thereof, and having enlarged diameter heads at opposite ends thereof projecting into central recesses in opposite ends of said plug, one of said heads is supported by said plug a predetermined axial distance from said shoulder in confronting, registering relation with, and for engagement by, the center of said disc, and said washer is secured adjacent its inner peripheral surface beneath the other of said heads, and is engaged adjacent its outer peripheral surface by said spring.

References Cited

UNITED STATES PATENTS

| | | | |
|---|---|---|---|
| 2,732,461 | 1/1956 | Huber | 337—365 |
| 3,356,087 | 12/1967 | Brown et al. | 337—365 |
| 2,497,025 | 2/1950 | Clason | 337—323 |
| 2,839,635 | 6/1958 | Hasselhorn | 337—16 |
| 3,255,331 | 6/1966 | Ulanet | 337—370 |

BERNARD A. GILHEANY, Primary Examiner

D. M. MORGAN, Assistant Examiner

U.S. Cl. X.R.

337—112